F. W. BASON.
TRIPLE VALVE PISTON RECTIFIER.
APPLICATION FILED APR. 8, 1910.
1,003,690.
Patented Sept. 19, 1911.
3 SHEETS—SHEET 1.
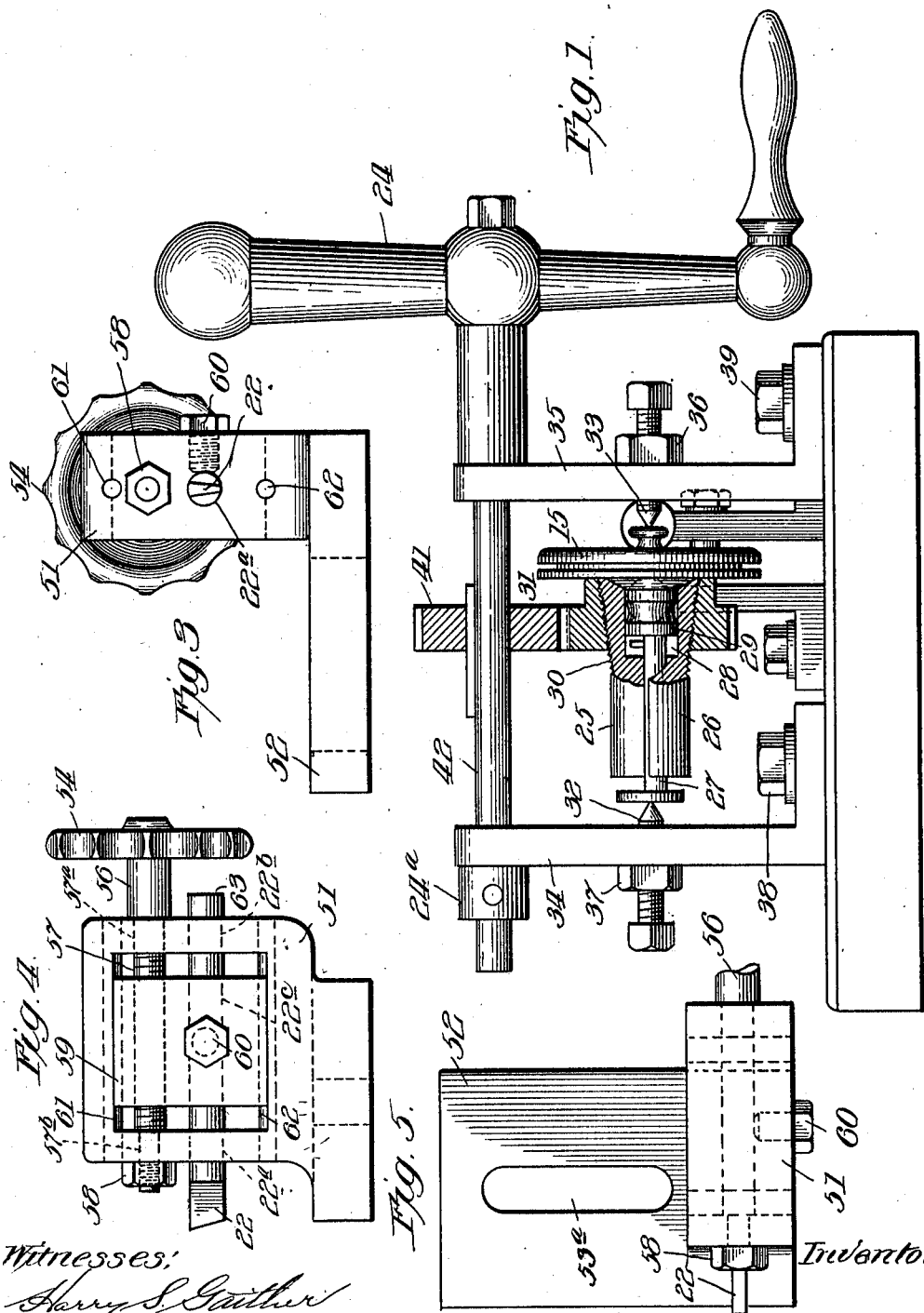

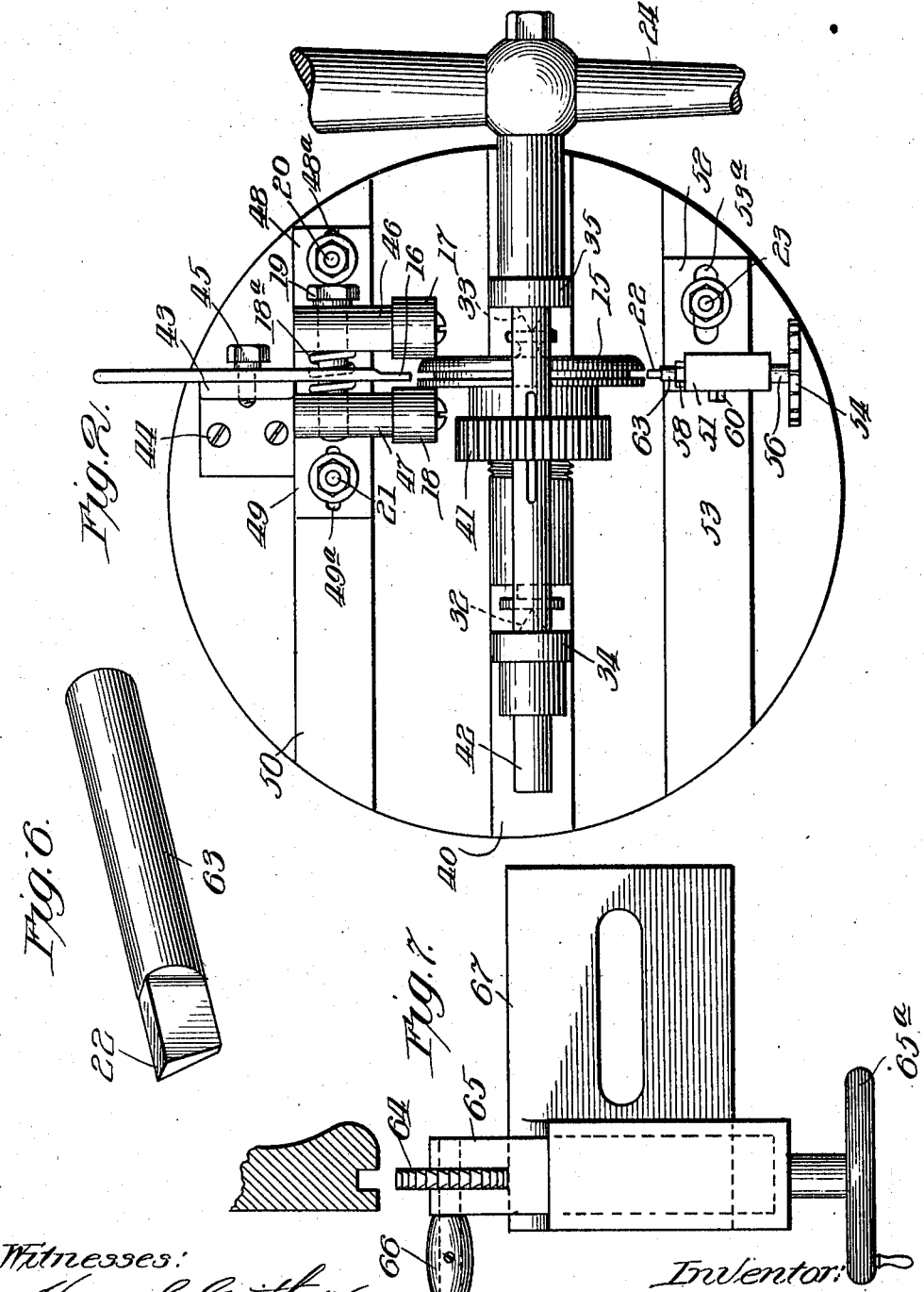

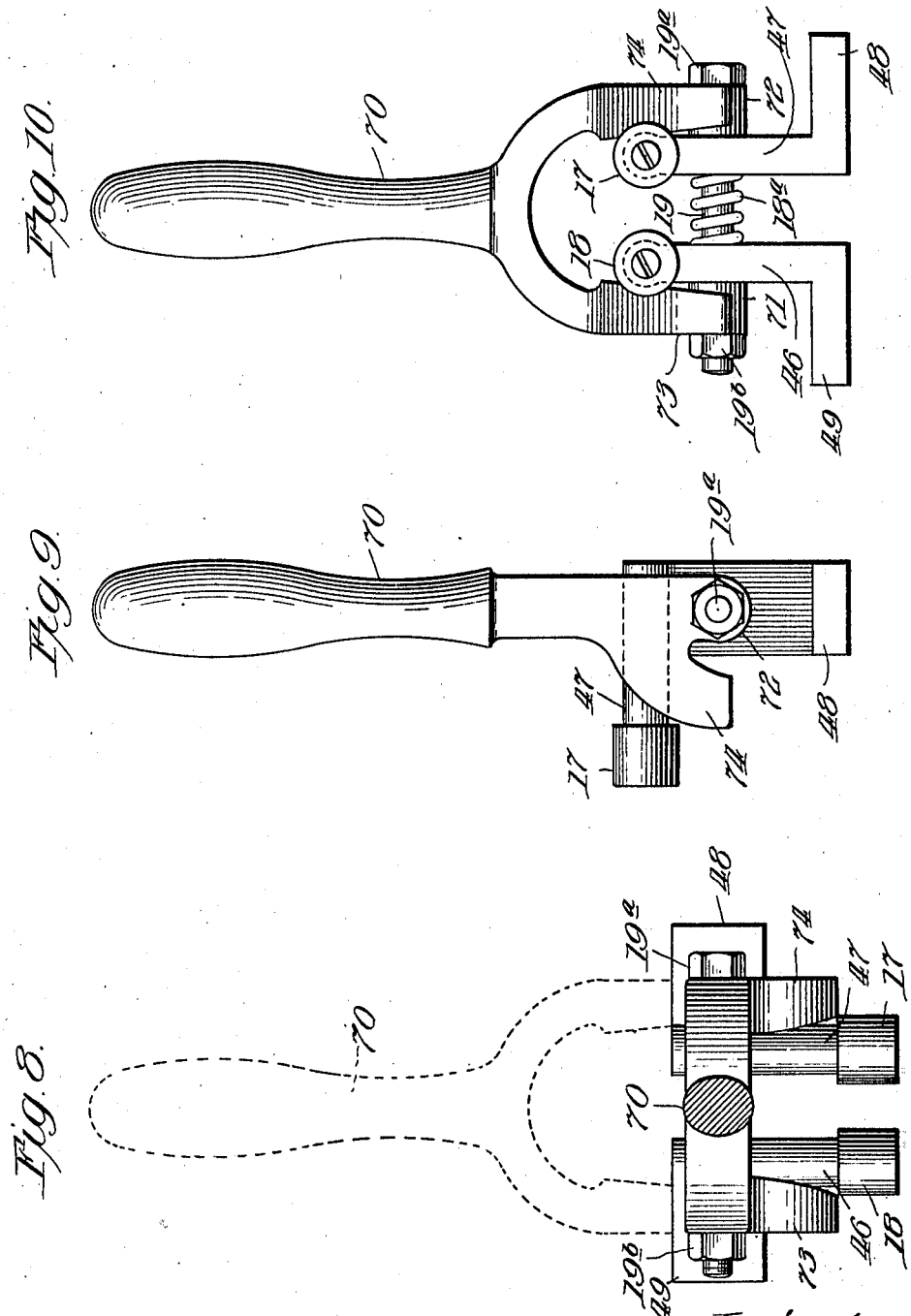

UNITED STATES PATENT OFFICE.

FREDERICK WILLIAM BASON, OF WEST PULLMAN, ILLINOIS.

TRIPLE-VALVE-PISTON RECTIFIER.

1,003,690.  Specification of Letters Patent.  Patented Sept. 19, 1911.

Application filed April 8, 1910. Serial No. 554,174.

*To all whom it may concern:*

Be it known that I, FREDERICK W. BASON, a citizen of the United States, residing at West Pullman, in the county of Cook and State of Illinois, have invented certain new and useful Improvements in Triple-Valve-Piston Rectifiers, of which the following is a specification.

My invention relates in general to machine tools and more particularly to an apparatus for straightening and reducing the packing ring grooves of triple valve pistons so that the packing rings will fit snugly in the grooves.

The triple valves referred to are used in air brake mechanism and have the important duty to perform of controlling the flow of air through the various parts of the air brake apparatus. The pistons referred to are actuated by train pipe and auxiliary reservoir pressures and it is very important that they be very accurately fitted in their surrounding cylinders in order to prevent the leakage of air around the pistons. It is very essential that the lateral motion of the packing ring in its groove be reduced to a minimum in order that the air acting on the piston when applying or releasing the brakes may not find its way through the groove and around the packing ring. If this leakage is excessive the pressures in the train pipe and auxiliary reservoir become equalized and the triple valve cannot properly perform its functions. My invention, however, may be used for truing up and fitting pistons for other purposes than those above described, and in fact it is applicable to any work in which it is desired to reduce the groove in a cylindrical piece of metal or to reduce the thickness of a projecting flange or for any work of a similar nature. These triple valves are connected to an iron train pipe in which there is naturally more or less corrosion and particles of rust, scales, dust etc. are present and find their way into the packing ring grooves of the triple valve pistons. For this reason the groove becomes more or less pitted and worn. It is the common practice to substitute new pistons for those in which defects of this character appear. To straighten up the inner faces of the groove has heretofore necessitated the making of a new packing ring of a different width than the standard. This practice has been considered prohibitive because the standard was destroyed and the cost was too great.

The object therefore of my invention is to provide means for gripping, rolling and truing the triple valve piston so as to reduce and reform the groove, preparatory to refitting the same with a new piston ring packing. By this means I am enabled to bring the packing grooves of old pistons back to the standard size, so that old pistons can be rolled and refitted as long as there is sufficient material left to work on.

Other objects and advantages of my invention will be apparent from the following specification and accompanying drawings, and the novel elements and combinations thereof will be particularly pointed out in the claims.

In the drawings—Figure 1 is a side elevation of my piston rectifying device, portions being broken away to show some of the interior structure. Fig. 2 is a plan view of the same. Fig. 3 is a detail showing an elevation of the truing tool and tool-post. Fig. 4 is a side elevation of the same. Fig. 5 is a plan view of the same. Fig. 6 is a perspective view of the truing tool. Fig. 7 is a plan view of a modification in which a milling-cutter is used as the truing tool. Figs. 8, 9 and 10 illustrate a cam device which may be employed for closing the rollers after the piston has been interposed between them.

Similar letters of reference refer to similar parts in the various figures.

In accomplishing the object of my invention, I place the piston 15 in a suitable chuck which will be described later and support the said piston between centers. The piston is adjusted to its proper position between said centers, with the assistance of a gage 16 which is suitably supported as will be described later. After it is thus adjusted to the proper position rollers 17 and 18 are brought to bear upon the opposite faces of the piston. They are caused to exert pressure upon the said faces of the piston by means of a screw 19 which simultaneously draws the roller supports toward each other and hence the rollers against the faces of the piston. The gage 16 may remain in the groove and serve as a resisting member for allowing either roller to act upon one face of the piston at will. The diameter of the piston may if reduced through wear incident to use, be slightly increased by the pressure of the rollers, in which case the gage would be left within the groove to provide an opposing member for the rollers while the rolling operation proceeds. The supports to which the rollers are attached are finally clamped in position by bolts 20 and 21.

After I have reduced the groove by pressure of the rollers 17 and 18 upon the faces of the piston I use a tool 22 for truing up the groove and bringing it to the exact size for the packing ring. The tool 22 is carried by a tool post which will be described later and which is fixed in position on the base of the machine by the screw or bolt 23.

The piston is rotated between the rolls 17 and 18 and by a hand crank 24 or other suitable motive power connected to the piston holding device through suitable gearing.

The piston is held in a chuck which comprises two halves 25 and 26, one of said halves having a semi-cylindrical groove therein for receiving the semi-cylindrical stem 27 of the piston. The flat face of this stem lies against the flat inner face of the semi-cylindrical half 25 of the chuck. The two halves of the chuck are provided with a cavity 28 in which the enlarged part 29 of the stem of the piston is inserted. The two halves of the chuck are tapered and exteriorly threaded as shown at 30 and a gear 31 is fitted to said tapered portion. The gear 31 has a hub projecting at one side which with the bore of said gear is tapered and threaded to fit the parts 25 and 26 of the chuck. The interior of the chuck may have different forms to suit various shapes of the parts to be operated upon. After I have placed the piston in the said chuck I then place the piston, chuck and gear in the machine and upon the centers 32 and 33 which are supported by the standards 34 and 35. The centers 32 and 33 are threaded into said standards and may be locked in their adjusted positions by the nuts 36 and 37. The standards 34 and 35 are secured to the base of the machine by screws 38 and 39, which may be tightened after the said standards have been adjusted to the desired positions. These standards have their bases fitted into a groove 40 on the base of the machine.

The gear 31 meshes with another gear 41, which is fixed to the shaft 42 having bearings in the standards 34 and 35. This shaft has a crank handle 24 fixed to it at one end and a collar 24$^a$ holds the shaft in place.

The gage 16 is carried by an angle bracket 43, which is secured to the base of the machine by screws 44. The said gage is held in place upon this angle bracket by a shouldered screw 45. A spring 18 is placed around the screw 19 between the posts 46 and 47 for the purpose of separating the said posts automatically when the screw 19 is loosened and the bolts 20 and 21 are also loosened.

The rollers 17 and 18 are mounted upon journals projecting from the standards 46 and 47. These standards have feet 48 and 49 which are fitted to a groove 50 in the base of the machine. These feet have slots 48$^a$ and 49$^a$ through which the bolts 20 and 21 extend and which permit of the adjustment of the standards to such positions as to allow the rollers 17 and 18 to bear upon the piston. After they are thus adjusted the screws or bolts 20 and 21 are tightened as desired. Either of these standards may be tightened more rigidly than the other in order to cause a greater pressure upon one side or the other of the piston at the will of the operator.

The truing tool 22 is preferably made from a round bar 63, which is inserted in apertures 22$^a$ and 22$^b$ in the tool post being fitted loosely therein and also in a hole 22$^c$ in a block 59. The tool is held securely in this block by a clamp screw 60.

The block 59 is slidably mounted in the tool post 51 and is guided therein by pins 61 and 62, which fit semi-cylindrical grooves in the top and bottom of the block. These pins are fitted into the tool post in such manner that half of their thickness lies in the body of the tool post and the other half of their thickness serves as a guide for the block 59, as previously described, and clearly shown in Fig. 4.

The tool block 59 is adjusted by means of a screw 57, which is threaded through said block. This screw has a shouldered portion 56 to which is attached a hand wheel 54. The opposite end of the screw is provided with a nut 58 preferably fixed to said screw and which retains the screw within the tool post. The screw is held in its proper position by the shouldered part 56 and the said nut 58. The screw is journaled in holes 57$^a$ and 57$^b$ in the tool post which are not threaded.

The tool post is provided with a foot or base 52 which is fitted to a channel 53 in the base of the machine. The said post has a slot 53$^a$ through which a bolt 23 passes and which permits adjustment of the said tool post.

In Fig. 7 I have shown a modified form of tool for truing the piston packing groove which consists of a milling-cutter 64 having a bearing in the holder 65. This milling-cutter may be driven by a belt which engages the pulley 66. This cutter may be held in a similar manner to the tool 22 and may be fed to its work by the hand wheel 65$^a$. It may be supported by a tool post having a base 67, which is fitted to the base of the machine in a similar manner to that previously described in connection with the tool 22 and its supporting base 52.

The operation of my invention is substantially as follows: After inserting the piston in the chuck and rotating the gear 30 on said chuck until the piston is securely held, the operator may then place the piston between the centers 32 and 33 and adjust said centers until the groove of the piston properly engages or registers with the gage 16. The rollers 17—18 are then moved into contact with the faces of the piston and the bolts 20 and 21 tightened. The desired pressure upon the faces of the piston is then secured by tightening the screw 19. This will cause the rollers to be simultaneously pressed against the faces of the piston with equal pressure. In placing the piston, together with the chuck and gear 31 into place between the centers 32 and 33, the said gear 31 is brought into mesh with the gear 41 and the piston may be rotated by means of the handle 24. When this handle is rotated the faces of the piston will be caused to move between the rollers 17 and 18 and the pressure of said rollers will cause a slight reduction in the width of the groove throughout the whole circumference of the piston. After the groove has been reduced to the desired extent, the tool 22 may be adjusted to a position having a proper relation to the groove and the tool may be fed into said groove by means of the hand wheel 54, while at the same time the piston is revolved by means of the handle 24. For adjusting the tool 22 to its proper position the tool post may be secured as previously described by means of the bolt 23. If it is desired to cause a pressure upon one side only of the piston by one only of the said rollers, the gage 16 may be left in place in the groove and may serve as a resisting member against which the single roller operates. Either roller 46 or 47 may be clamped more rigidly than the other or both clamped lightly.

When the groove is only slightly out of true the tool 22 may not be used as the gage 16 would be sufficient for the purpose.

In Figs. 8, 9 and 10 I have illustrated a device by means of which the rollers 17 and 18 may be conveniently pressed against the opposite faces of the interposed piston. The device consists of a yoke comprising a handle 70, and bifurcated ends 71 and 72, which surround the bolt 19, which loosely extends through the standards 46 and 47. The head 19$^a$ of the bolt 19 engages the outer surface of the arm 72 while the nut 19$^b$ engages the end of the bolt 19 and bears against the surface of the other bifurcation 71 of the yoke. The handle is thrown backwardly from the position shown in Fig. 9 to that indicated in dotted lines in Fig. 8, thereby permitting the spring 19$^a$ to force the standards 46 and 47 apart, thereby separating the rollers 17 and 18 so as to permit the introduction between them of the piston 15. The lever is then swung from the dotted position shown in Fig. 8 into the upright positions shown in Figs. 9 and 10, thereby moving the cams 73 and 74 relatively to the standards 46 and 47 so as to force the standards toward each other against the tension of the spring 18$^a$. The rollers 17 and 18 are thereby forced toward each other and pressed positively against the opposite faces of the piston. In order to release the piston, the handle 70 of the cam device is thrown to the right from the position shown in Fig. 9 so as to disengage the cams 73 and 74 from the standards 46 and 47, thereby permitting the spring 18$^a$ to separate the standards and move the rollers away from the opposite faces of the piston.

While I have described my invention more or less precisely with regard to its details of construction and arrangement, I do not wish to be understood as limiting myself thereto as I contemplate changes in the form and the proportion of parts and the substitution of equivalents, within the scope of my claims as circumstances may suggest or render expedient without departing from the spirit of my invention.

I claim:

1. The combination with means for rotatably supporting a peripherally grooved piston, of means adapted to press against the face of the piston at one side of the groove therein, and means for rotating the piston relatively to said second means.

2. The combination with means for rotatably supporting a peripherally grooved piston, of a gage adapted to extend within the groove in the piston, a device adapted to press against the face of the piston at one side of the groove therein, and means for rotating the piston relatively to said gage and device.

3. The combination with means for rotatably supporting a peripherally grooved piston, of a device adapted to press against the face of the piston at one side of the groove therein, and a truing tool adapted to extend into the groove to restore the same to standard width, and means for rotating the piston relatively to said device and truing tool.

4. In a machine of the character described, the combination with a supporting base, of a pair of standards mounted upon said base, a holder for rotatably supporting a peripherally grooved piston between said standards, means for imparting rotary motion to said holder, and a pressure device mounted upon said base in position to bear against the face of the piston at one side of the groove therein.

5. In a machine of the character described, the combination with a supporting base, of a pair of standards mounted upon said base, a holder for rotatably supporting a peripherally grooved piston between said standards, means for imparting rotary motion to said holder, and a pair of pressure rollers mounted upon said base and adapted to bear against the faces of the piston on opposite sides of the groove therein.

6. In a machine of the character described, the combination with a supporting base, of a pair of standards mounted upon said base, a holder for rotatably supporting a peripherally grooved piston upon said standards, means for imparting rotary motion to said holder, a gage mounted upon said base adapted to extend within the groove in the piston, and a pressure device mounted upon said base in position to bear against the face of the piston at one side of the groove therein.

7. In a machine of the character described, the combination with a supporting base, of a pair of standards mounted upon said base, a holder for rotatably supporting a peripherally grooved piston between said standards, means for imparting rotary motion to said holder, a pressure device mounted upon said base in position to bear against the face of the piston at one side of the groove therein, and a truing tool mounted upon said base adapted to enter the piston groove to restore the same to standard width.

8. In a machine of the character described, the combination with a supporting base, of a pair of standards mounted upon said base, a holder for rotatably supporting a peripherally grooved piston upon said standards, means for imparting rotary motion to said holder, a gage mounted upon said base adapted to extend within the groove in the piston, a pressure device mounted upon said base in position to bear against the face of the piston at one side of the groove therein, and a truing tool mounted upon said base adapted to enter the piston groove to restore the same to standard width.

In testimony whereof, I have subscribed my name.

FREDERICK WILLIAM BASON.

Witnesses:
 FLORENCE A. FLORELL,
 EDYTHE M. ANDERSON.

---

Copies of this patent may be obtained for five cents each, by addressing the "Commissioner of Patents, Washington, D. C."